Nov. 22, 1960
F. STONE
2,960,979
COOKING APPARATUS
Filed Sept. 10, 1956
2 Sheets-Sheet 1
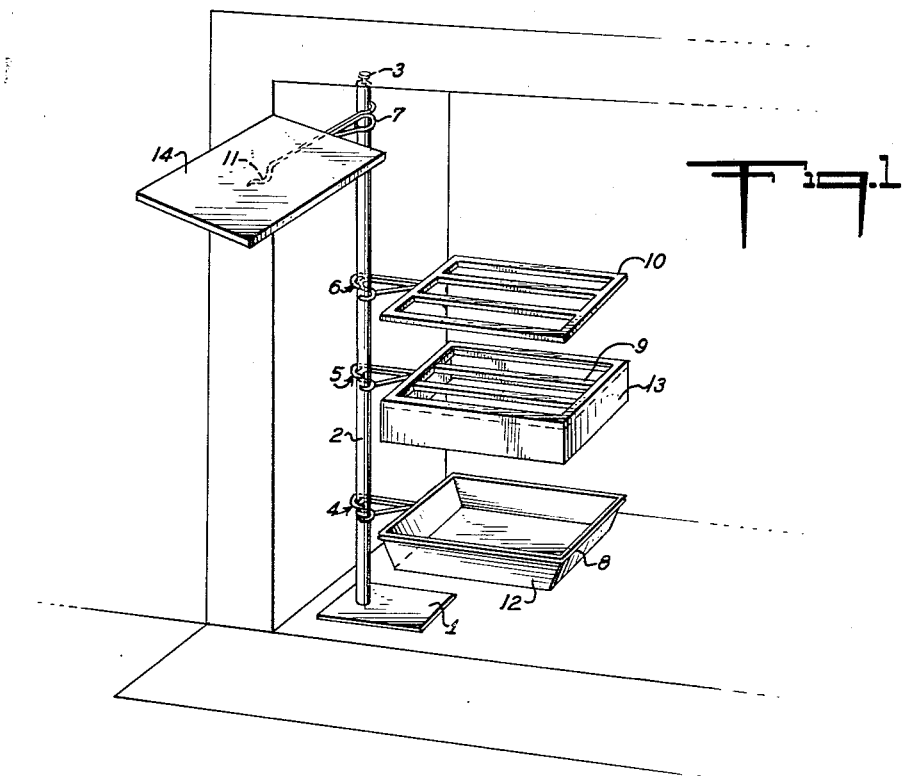
Fig. 1
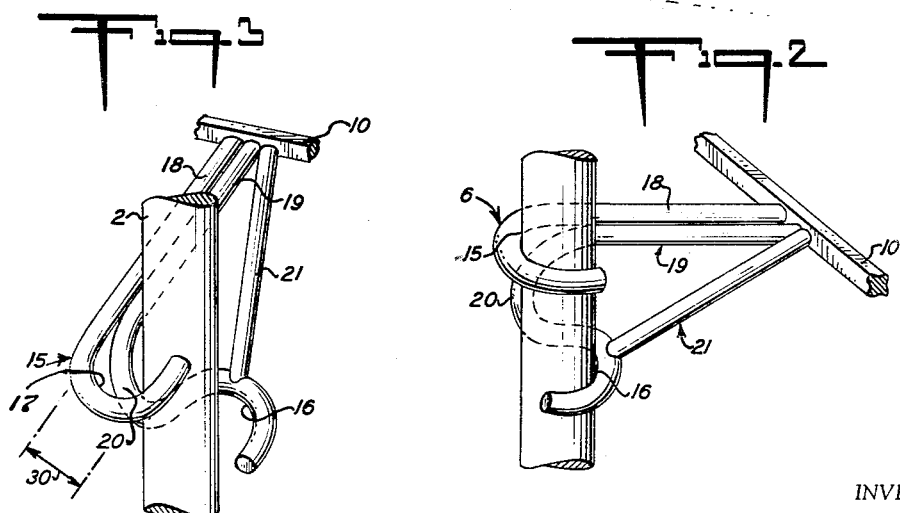
Fig. 3
Fig. 2
INVENTOR
FREDERICK STONE
BY
ATTORNEYS Nov. 22, 1960
F. STONE
2,960,979
COOKING APPARATUS
Filed Sept. 10, 1956
2 Sheets-Sheet 2
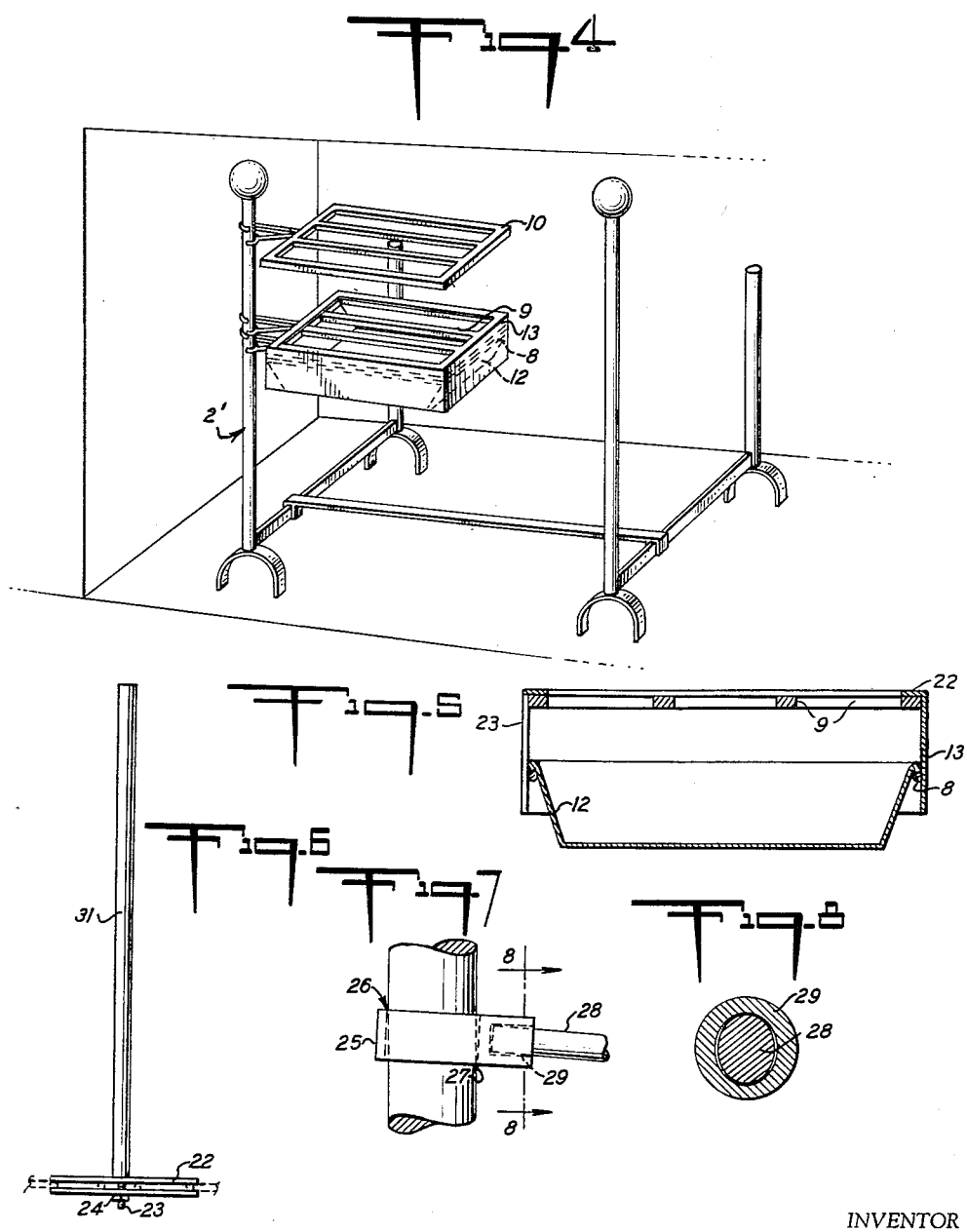
INVENTOR
FREDERICK STONE
BY *Linnaken & Mathis*
ATTORNEYS

United States Patent Office 2,960,979
Patented Nov. 22, 1960

2,960,979

COOKING APPARATUS

Frederick Stone, Rte. 1, Hardy, Va.

Filed Sept. 10, 1956, Ser. No. 609,019

3 Claims. (Cl. 126—25)

This invention relates to improvements in cooking apparatus, and more particularly to apparatus which may be employed in fireplaces, which also may be used, if desirable, with open fire outside or in a fireplace, and which may include its own firebox, grills, stand, etc.

Fireplaces and campfires have long been used in cooking food, but their use is generally made inconvenient for that purpose by heat and smoke. It is, therefore, an object of this invention to obviate the need for a large open fire, and to provide means for cooking where the smoke is light and the heat is controllable.

It is another object of this invention to provide cooking apparatus which is portable, yet provides a stable and convenient base upon which to support cooking utensils and a fire.

Still another object of this invention is to provide cooking utensils which may be attached quickly and easily to the andirons in a fireplace for use therein.

It is an object of this invention to provide a simple, efficient device which may be engaged by, and disengaged from, an upright stand by a simple twisting motion, but which will offer a strong frictional support against the sides of the upright.

Other objects and advantages of this invention will be apparent from the following description.

A preferred embodiment of the invention, together with modifications thereof, are set forth in the accompanying drawings, in which:

Fig. 1 is a perspective view of one embodiment of the invention, set up in a fireplace;

Fig. 2 is a detailed perspective view of one of the hooks used in the preferred embodiment;

Fig. 3 is a detailed perspective view of the hook shown in Fig. 2, which has been turned to show the manner in which it may be removed from the stand;

Fig. 4 is a perspective view showing how the invention may be employed with the andirons of a fireplace in lieu of the stand;

Fig. 5 is a cross sectional view showing the windshield and grill in an adjusted operative position with respect to the fire box intermediate the positions of the windshield and grill in Figs. 1 and 4;

Fig. 6 is an elevation showing a variation of the upright stand which may be applied to the grill of a conventional charcoal broiler;

Fig. 7 illustrates a detail of a ring fastener which may be used in place of the hooks; and Fig. 8 is a cross section on line 8—8 in Fig. 7.

Referring to the drawings in detail, Fig. 1 shows a base 1 in the form of a flat plate in which the lower end of the standard or post 2 is fastened. The standard 2 may be in the form of a round bar, tube or the like, preferably circular in cross section. For outdoor use, the standard 2 may be secured to any suitable or available article, such as a picnic table.

The upper end of the standard 2 is held in place by contact with the under side of the top of the fireplace through an adjustable screw 3. Affixed to the standard 2 through hooks 4, 5, 6 and 7 are, respectively, a rectangular ring 8, a grill or grid 9, a grill or grid 10, and a pot hook 11.

Shown supported in the rectangular ring 8 is a sheet metal or cast iron pan 12 which is designated hereinafter as the firebox, since that is its function. Supported by the grid 9 is a boxlike structure 13 which has no bottom and only a narrow flange around the top, as shown in Fig. 5. Box 13 is hereinafter called a windshield since it serves to shield the firebox from the motion of air. It also serves to prevent heat loss from the fire. The windshield 13 is supported by its surrounding inturned flanges 22 on the grid 9, and may be removed readily therefrom. The windshield has a slot 23 in its side wall near the post to clear the support clamp of the grill 9 and fire box 12. It may not be needed indoors, nor outdoors when there is no disturbing wind.

The pot hook 11 is commonly covered by a work table 14 which may be removed readily. The pot hook can be so spaced from the work table that it will support a pot even when the work table 14 is attached. The work table may be used when it is fastened to the hook, to support utensils, seasoning material, etc.

The hooks 4, 5, 6 and 7 are free to swing about the standard 2 horizontally, and are mounted thereon by clamps 15. Due to their unique construction, the clamps 15, at the same time, support the weights imposed upon them through their bearing surfaces 16 and 17.

Each of the clamps 15 is formed of opposed hooks spaced apart vertically, as indicated at 16 and 17. The hook 17 is formed on the outer end of a horizontal support 18, extending outwardly from the article supported thereby, such as the grid 10. The hook 16 is formed as a reverse bend on the outer end of a support rod 19 that extends out from the supported article 10, in this instance, the intermediate loop being indicated at 20. The hook 16 is braced by a rod 21, that extends upwardly to the supported article 10. The rods 18 and 19 extend side-by-side and may be welded together if desired, for rigidity of structure.

The spacing between the firebox 12, the windshield 13, the grill 10, and the work table 14 may be varied by raising one or more of these implements by the edge opposed to the respective hook, so that the hook may be slid up or down on the stand 2 with only one bearing surface against the stand.

The relationship between the grills, the firebox and the windshield is shown more clearly in Figs. 4 and 5. The upper grill 10 may be used for warming or very low heat while cooking simultaneously with high heat cooking on grid 9. In Fig. 4, the windshield is shown enveloping the firebox 12 and ring 8 from its support on grill 9. Fig. 5 shows the same arrangement in cross section with the windshield and grid 9 elevated somewhat with respect to the fire box 12.

In its preferred mode of use, a fire will be built in the firebox 12, using charcoal or some other suitable fuel, and the windshield 13 may be moved up or down to adjust the intensity of the heat which reaches the grills 9 and 10.

The material to be cooked then may be placed on the grills 9 and 10. If it becomes necessary to vary the heat after cooking is commenced, a simple adjustment of the position of one or more of the hooks can be made. The fire can be attended readily by simply turning the firebox horizontally and changing the amount of fuel available. Likewise, the grill 9 may be swung outward, away from the fire, which is a great advantage over other grills where, when grease begins to blaze, the steak, etc., must be lifted from the grill.

In Fig. 2 is shown a hook which may be used to support the units of the cooking apparatus on their upright stand. The bearing surfaces 15 and 16 thrust against the sides of the standard 2 with forces determined by the weight on the respective firebox, grill, or pot hook. It is clear from Fig. 2, and the laws of vector analysis, that the vector sum of these bearing forces and the weight on the device being supported must equal zero when the hooks are stationary. This state of equilibrium is obtained by providing that bearing faces 16 and 17 are spaced apart with the lower bearing face placed on the same side of the stand as the weight applied, while the upper bearing face is placed on the opposite side. It is possible to modify the form of the hook by removing either rod 18 or rod 19 without destroying its operativeness, providing the bearing faces 16 and 17 are by some means supported in fixed relation, and the remaining parts are made strong enough to support the weight.

Fig. 3 illustrates the manner in which the hooks may be disengaged from the standard. As shown, the hook is raised so that the bearing faces 16 and 17 disengage the standard, and the hook is then turned so that the standard will pass through the opening 30 therebetween.

The use of the firebox, grills, and windshield in conjunction with conventional andirons, such as are commonly found in fireplaces, is shown in Fig. 4. The hooks are made so that it is possible to engage them with the vertical portion of a conventional andiron such as that shown at 21 and thus to secure the advantages of the construction shown in Fig. 1 without the necessity of setting up a separate support such as rod 2.

Fig. 5 shows the firebox 12, supported on the rectangular ring 8, and with the grill 9 supporting the windshield 13. In the position shown in Fig. 5, food placed on the grill 9 would be in position to receive a substantial amount of heat from the firebox, and it can readily be seen that by moving the grill 9 upward or the ring 8 downward, less heat would be obtained. The drawing also shows that the windshield 13 is designed to enclose or envelop an area slightly larger than the top of the firebox so that when the windshield is used in this device, it will serve to prevent cross currents of air from entering the firebox, and will, at the same time, serve to direct the radiant heat from the firebox to the lower side of grill 9.

It is frequently desirable to secure the advantages of this invention in connection with more conventional equipment, such as one of the charcoal broilers presently on the market. These broilers usually consist of a firebox with a grill made of wire or rods over the top and make no provision for adjustment of the heat except by varying the fire. The present invention may be adapted, in whole or in part, to provide for adjustment of the heat by the use of a grill and windshield applied thereto, as described above.

The method of making this adaptation will be clear from the drawings. In Fig. 6 is shown a rod 31 which may be fixed in an upright position on the grill of a conventional charcoal broiler by clamping the rods 22 over the grill and tightening it to the grill by a bolt 23 and a nut 24. Once the rod 31 has been fastened upright on the grill any or all of the components shown attached to the standard 2 in Fig. 1 or andiron 2' in Fig. 4, may be attached thereto. If the firebox of the conventional charcoal broiler is used, only the windshield and grills of the invention need be used.

In Fig. 7 is shown a ring fastener which may be substituted for the hooks in order to secure the various components to the upright support. This ring may be turned freely in a horizontal direction, as may the hooks, and it will support a weight in the vertical direction on surfaces 26 and 27. A rod 28 seats in an opening 29, so that various components which will be fastened to rods like 28 may be interchanged on the sleeve 25, thereby making it possible to obtain a large degree of flexibility in the arrangement of the components of the sleeve 25.

In Fig. 8 is shown means designed to prevent the various components from turning about a horizontal axis through rod 28. This means consists in making the rod 28 and its seat 29 "off round" or substantially oval in shape.

It would be possible, of course, to fix the upright stand out of doors on a spike driven into the ground or supported on a tripod, or bolted to a picnic table. It would also be obvious to use a rod, such as a conventional post, that is of a suitable diameter, but relatively fixed as against a patio wall, as the upright support in connection with the embodiments shown.

The supporting hooks described also may be used separately in many different applications, to support various other types of articles on a standard or suitable support.

While the invention has been illustrated and described in certain embodiments, it is recognized that variations and changes may be made therein without departing from the invention as set forth in the claims.

I claim:
1. Cooking apparatus comprising an upright post, cooking elements including a fire box, grid, and windshield, means mounting said elements on said post for vertical adjustment, said windshield having inturned flanges providing an open top and overlying said grid, said windshield having depending sides extending below the top of and enveloping said fire box.

2. Cooking apparatus comprising an upright post, cooking elements including a fire box, grid, and windshield, means mounting said elements on said post for vertical adjustment, said windshield having inturned flanges providing an open top and overlying said grid, said windshield having depending sides extending below the top of and enveloping said fire box, said post having means on one end providig an adjustable extension, whereby the apparatus may be mounted and held in a fireplace.

3. Cooking apparatus comprising an upright post, a supporting cooking implement and means mounting the supporting implement on the post for swinging and vertical adjustments relative to the post and attachment to and detachment from said post by raising the outer end of the implement slightly and by a twist of the implement about its longitudinal axis, said mounting means comprising a clamp having a pair of rods extending horizontally in side by side relation, means securing said rods together, one of said rods having the outer end thereof bent back upon itself to form a hook engaging one side of the post, the other rod having its outer end extending downwardly in an S-shaped configuration and terminating in a hook disposed oppositely 180 degrees from and spaced below the first named hook, and a third rod interconnecting said second hook and said implement.

References Cited in the file of this patent
UNITED STATES PATENTS

| | | |
|---|---|---|
| 475,701 | Paschal | May 24, 1892 |
| 746,539 | Low | Dec. 8, 1903 |
| 747,475 | Perky | Dec. 22, 1903 |
| 903,302 | Moore | Nov. 10, 1908 |
| 927,214 | Bolland | July 6, 1909 |
| 1,038,121 | Grover | Sept. 10, 1912 |
| 1,169,831 | Jeavons | Feb. 1, 1916 |
| 1,201,427 | Angvick | Oct. 17, 1916 |
| 1,398,152 | Ramsay | Nov. 22, 1921 |
| 1,452,640 | Hulick | Apr. 24, 1923 |
| 1,455,312 | Turner | May 15, 1923 |
| 1,607,101 | Savereid | Nov. 16, 1926 |
| 1,666,293 | Lorton | Apr. 17, 1928 |
| 2,173,024 | Park | Sept. 12, 1939 |
| 2,174,435 | Boyter | Sept. 26, 1939 |
| 2,506,698 | Beals | May 9, 1950 |

(Other references on following page)

UNITED STATES PATENTS

| | | | |
|---|---|---|---|
| 2,522,223 | Hardin et al. | Sept. 12, | 1950 |
| 2,604,884 | Walker | July 29, | 1952 |
| 2,624,329 | Ernst | Jan. 6, | 1953 |
| 2,629,315 | Schaar | Feb. 24, | 1953 |
| 2,631,579 | Metzger | Mar. 17, | 1953 |
| 2,740,397 | Schaefer | Apr. 3, | 1956 |
| 2,765,999 | Baker | Oct. 9, | 1956 |
| 2,827,846 | Karkling | Mar. 25, | 1958 |

FOREIGN PATENTS

| | | | |
|---|---|---|---|
| 526,739 | Belgium | Mar. 15, | 1954 |
| 419,633 | France | Oct. 29, | 1910 |
| 1,079,077 | France | May 19, | 1954 |
| 55,924 | Switzerland | Apr. 8, | 1922 |